(12) United States Patent
Dahal et al.

(10) Patent No.: US 11,542,194 B2
(45) Date of Patent: Jan. 3, 2023

(54) COATED GLASS ARTICLE, METHOD OF MAKING THE SAME, AND PHOTOVOLTAIC CELL MADE THEREWITH

(71) Applicant: PILKINGTON GROUP LIMITED, Lathom (GB)

(72) Inventors: Lila Raj Dahal, Perrysburg, OH (US); Douglas Martin Nelson, Curtice, OH (US); Jun Ni, Maumee, OH (US); David Alan Strickler, Toledo, OH (US); Srikanth Varanasi, Ottawa Hills, OH (US)

(73) Assignee: Pilkington Group Limited, Lathom (GB)

( * ) Notice: Subject to any disclaimer, the term of this patent is extended or adjusted under 35 U.S.C. 154(b) by 52 days.

(21) Appl. No.: 16/640,156

(22) PCT Filed: Aug. 31, 2018

(86) PCT No.: PCT/GB2018/052463
§ 371 (c)(1),
(2) Date: Feb. 19, 2020

(87) PCT Pub. No.: WO2019/043398
PCT Pub. Date: Mar. 7, 2019

(65) Prior Publication Data
US 2021/0155535 A1 May 27, 2021

Related U.S. Application Data

(60) Provisional application No. 62/552,735, filed on Aug. 31, 2017.

(51) Int. Cl.
*B32B 15/04* (2006.01)
*B32B 17/06* (2006.01)
(Continued)

(52) U.S. Cl.
CPC .......... *C03C 17/3417* (2013.01); *C03C 3/087* (2013.01); *C03C 2217/211* (2013.01);
(Continued)

(58) Field of Classification Search
CPC ................ C03C 2217/94; C03C 2217/211
(Continued)

(56) References Cited

U.S. PATENT DOCUMENTS 4,922,853 A   5/1990 Hofer
5,401,305 A   3/1995 Russo et al.
(Continued)

FOREIGN PATENT DOCUMENTS

FR   2963343 A1   2/2012
JP   H08109043 A   4/1996
(Continued)

OTHER PUBLICATIONS

European Patent Office, International Search Report with Written Opinion, issued in PCT/GB2018/052463, dated Nov. 2, 2018, 22 pages, European Patent Office, Rijswijk, Netherlands.

*Primary Examiner* — Lauren R Colgan
(74) *Attorney, Agent, or Firm* — Marshall & Melhorn, LLC (57) ABSTRACT

A coated glass article includes a glass substrate. A coating is formed on the glass substrate. The coating includes a first coating layer. The first coating layer includes fluorine doped tin oxide. A second coating layer is provided between the glass substrate and the first coating layer. The second coating layer includes silicon dioxide and at least one of phosphorus and boron. The coated glass article exhibits a haze of 2.0% or less.

19 Claims, 3 Drawing Sheets

(51) Int. Cl.
*C03C 17/34* (2006.01)
*C03C 3/087* (2006.01)

(52) U.S. Cl.
CPC .... *C03C 2217/213* (2013.01); *C03C 2217/24* (2013.01); *C03C 2217/94* (2013.01)

(58) Field of Classification Search
USPC .................................................. 428/428, 432
See application file for complete search history.

(56) References Cited

U.S. PATENT DOCUMENTS

| | | | |
|---|---|---|---|
| 5,599,387 A | 2/1997 | Neuman et al. | |
| 5,798,142 A | 8/1998 | Soubeyrand | |
| 6,106,892 A | 8/2000 | Ye | |
| 6,797,388 B1 | 9/2004 | Szanyi et al. | |
| RE41,799 E | 10/2010 | Russo et al. | |
| 8,133,599 B2 | 3/2012 | Lu et al. | |
| 8,685,490 B2 | 4/2014 | Lu et al. | |
| 9,224,892 B2 | 12/2015 | Lu | |
| 9,366,783 B2 | 6/2016 | Lu | |
| 9,540,277 B2 | 1/2017 | Nelson et al. | |
| 9,776,914 B2 | 10/2017 | Wang et al. | |
| 2005/0196623 A1* | 9/2005 | McKown | C03C 17/3417 428/432 |
| 2005/0221003 A1* | 10/2005 | Remington | C03C 17/245 427/248.1 |
| 2010/0285290 A1* | 11/2010 | Lu | C03C 17/3417 428/213 |
| 2011/0146768 A1* | 6/2011 | Lu | H01L 31/022466 136/255 |
| 2012/0172209 A1* | 7/2012 | Lu | C03C 17/3417 502/214 |
| 2013/0129945 A1* | 5/2013 | Durandeau | C03C 17/3441 428/34 |
| 2013/0316140 A1* | 11/2013 | Lu | H01L 31/022466 428/142 |
| 2013/0333752 A1 | 12/2013 | Lu | |
| 2015/0017431 A1* | 1/2015 | Wang | C23C 16/45595 428/336 |
| 2016/0002100 A1* | 1/2016 | Melcher | B32B 17/10174 204/192.27 |

FOREIGN PATENT DOCUMENTS

| | | |
|---|---|---|
| JP | H10506874 A | 7/1998 |
| JP | 2003522088 A | 7/2003 |
| WO | 2010/059507 A1 | 5/2010 |
| WO | 2011084297 A2 | 7/2011 |
| WO | 2013/136052 A2 | 9/2013 |

* cited by examiner

COATED GLASS ARTICLE, METHOD OF MAKING THE SAME, AND PHOTOVOLTAIC CELL MADE THEREWITH

CROSS-REFERENCE TO RELATED APPLICATION

This application is claiming the benefit, under 35 U.S. C. 119(e), of the U.S. provisional patent application which was granted Ser. No. 62/552,735 and filed on Aug. 31, 2017, the entire disclosure of which is hereby incorporated by reference.

BACKGROUND

This invention relates in general to a coated glass article and a method of making the coated glass article. This invention also relates to a photovoltaic cell made with the coated glass article.

A coating can be deposited over a glass substrate to form a coated glass article. Coated glass articles having coatings that exhibit sufficient electrically conductive may be suitable for use in the manufacture of photovoltaic cells. When such a coated glass article is used in the manufacture of a photovoltaic cell, the coating may be utilized as an electrode.

Photovoltaic cells convert visible light into electricity. The amount of power a photovoltaic cell can produce is a function of the amount of visible light that enters the cell. For example, as more light enters the photovoltaic cell, the cell's power output generally increases. The amount of power a photovoltaic cell can produce is also a function of the electrical losses experienced by the cell. A component of the electrical loss is the electrical resistance of the photovoltaic cell's electrodes.

Therefore, it would be desirable to provide a coated glass article that could be used in the manufacture of a photovoltaic cell and improves the amount of visible light that is able to enter the cell. A coated glass article that exhibits an improved electrical resistance would also be beneficial. Still further, it would be desirable to provide a method of making the coated glass article.

BRIEF SUMMARY

Embodiments of a coated glass article are provided. In an embodiment, the coated glass article comprises a glass substrate. A coating is formed on the glass substrate. The coating comprises a first coating layer. The first coating layer comprises fluorine doped tin oxide. A second coating layer is provided between the glass substrate and the first coating layer. The second coating layer comprises silicon dioxide and at least one of phosphorus and boron. The coated glass article exhibits a haze of 2.0% or less.

Preferably, the glass substrate is a soda-lime-silica glass.

Preferably, the glass substrate comprises 0.15 weight % $Fe_2O_3$ (total iron) or less.

Preferably, the coating is pyrolytic.

Preferably, the first coating layer is deposited at a thickness of 150-1,000 nm.

In some embodiments, the thickness of the first coating layer is 200-850 nm.

In other embodiments, the thickness of the first coating layer is 250-500 nm.

Preferably, the second coating layer has a refractive index that is less than 1.8.

In some embodiments, the refractive index of the second coating layer is between 1.2 and 1.6.

In some embodiments, the second coating layer comprises phosphorus.

In some embodiments, the second coating layer comprises boron.

In some embodiments, the second coating layer comprises phosphorus and boron.

Preferably, a third coating layer is deposited directly on a major surface of the glass substrate, wherein the second coating layer is deposited directly on the third coating layer such that there are no intervening layers between the second coating layer and the third coating layer.

Preferably, the third coating layer comprises undoped tin oxide.

Preferably, an additional coating layer is deposited directly on the first coating layer, wherein the additional coating layer is deposited directly on the first coating layer such that there are no intervening layers between the first coating layer and the additional coating layer.

In some embodiments, the additional coating layer is a fourth coating layer that forms an outer surface of the coated glass article.

Preferably, the additional coating layer comprises undoped tin oxide.

In some embodiments, the coating exhibits a sheet resistance of 5-150 ohm/sq.

Preferably, the sheet resistance exhibited by the coating is 5-50 ohm/sq.

In some embodiments, the haze exhibited by the coated glass article is 0.5-2.0%.

Preferably, the haze exhibited by the coated glass article is 1.6% or less.

More preferably, the haze exhibited by the coated glass article is 0.5-1.6%.

In some embodiments, the fluorine doped tin oxide comprises tin oxide that is less than fully doped with fluorine.

In other embodiments, the fluorine doped tin oxide comprises tin oxide that is fully doped with fluorine.

Also, embodiments of a method of making a coated glass article are provided. In an embodiment, the method comprises providing a glass substrate. A coating is formed on the glass substrate by depositing a first coating layer. The first coating layer comprises fluorine doped tin oxide. A second coating layer is provided between the glass substrate and the first coating layer. The second coating layer comprises silicon dioxide and at least one of phosphorus and boron. The coated glass article exhibits a haze of 2.0% or less.

Preferably, a gaseous mixture comprised of a silane compound, a first oxygen-containing molecule, a radical scavenger, and at least one of a phosphorus-containing compound and a boron-containing compound is formed. The gaseous mixture is directed toward and along the glass substrate and the gaseous mixture is reacted over the glass substrate to form the second coating layer on the glass substrate.

Preferably, the first coating layer is deposited directly on the second coating layer such that there are no intervening layers between the first coating layer and the second coating layer.

Preferably, a third coating layer that comprises undoped tin oxide is deposited directly on a major surface of the glass substrate, wherein the second coating layer is deposited directly on the third coating layer such that there are no intervening layers between the second coating layer and the third coating layer.

In some embodiments, a fourth coating layer that comprises undoped tin oxide is deposited directly on the first coating layer, wherein the fourth coating layer is deposited directly on the first coating layer such that there are no intervening layers between the first coating layer and the fourth coating layer.

Embodiments of a photovoltaic cell are provided. In an embodiment, the photovoltaic cell comprises a coated glass article as described above.

BRIEF DESCRIPTION OF THE SEVERAL VIEWS OF THE DRAWING

The above, as well as other advantages of the process will become readily apparent to those skilled in the art from the following detailed description when considered in the light of the accompanying drawings in which.

DETAILED DESCRIPTION

It is to be understood that the invention may assume various alternative orientations and step sequences, except where expressly specified to the contrary. It is also to be understood that the specific articles, apparatuses and processes described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in the various embodiments described within this section of the application may be commonly referred to with like reference numerals.

Embodiments of a coated glass article 10 will be described below. In certain embodiments, the coated glass article 10 may be utilized in the manufacture of a photovoltaic cell. It would be understood by one of ordinary skill in the art that the coated glass article 10 could also be utilized as a superstrate or substrate in the manufacture of the photovoltaic cell. Furthermore, the coated glass article 10 described herein is not limited to photovoltaic cell applications. For example, the coated glass article 10 may be utilized in architectural glazings, electronics, and/or have automotive, locomotive, industrial, naval, and aerospace applications.

Figure 1:
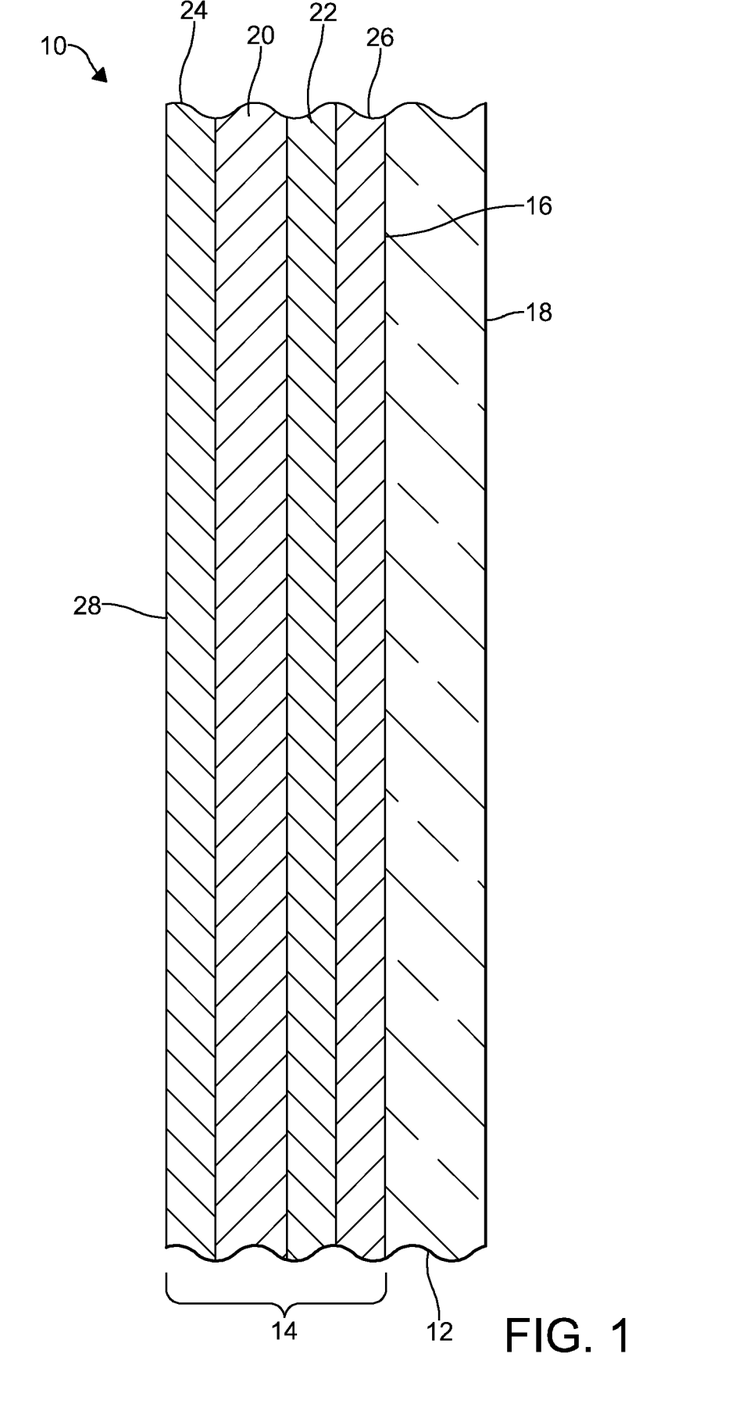
FIG. 1 is a cross-sectional view of an embodiment of a coated glass article in accordance with the invention.

Referring now to FIG. 1, the coated glass article 10 comprises a glass substrate 12. In some embodiments, the glass substrate 12 is not limited to a particular thickness. However, in certain embodiments, the glass substrate 12 may have a thickness of 20.0 millimeters (mm) or less. Preferably, the glass substrate 12 may have a thickness of 0.5-20.0 mm. In some embodiments, the glass substrate 12 may have a thickness of 2.0-20.0 mm.

Also, the glass substrate 12 may be of any of the conventional glass compositions known in the art. However, it is preferred that the glass substrate 12 is a soda-lime-silica glass. When the glass substrate 12 is a soda-lime-silica glass, the glass substrate 12 may comprise 68-74 weight % $SiO_2$, 0-3 weight % $Al_2O_3$, 0-6 weight % MgO, 5-14 weight % CaO, 10-16 weight % $Na_2O$, 0-2 weight % $SO_3$, 0.005-2 weight % $Fe_2O_3$, and 0-5 weight % $K_2O$. The glass may also contain other additives, for example, refining agents, which would normally be present in an amount of up to 2%.

In certain embodiments, the glass substrate 12 may be a portion of a float glass ribbon. In some embodiments, the glass substrate 12 may be clear float glass. In some of these embodiments, clear float glass may mean a glass having a composition as defined in a related standard such as BS EN 572-1:2012+A1:2016 and BS EN 572-2:2012. However, the glass substrate 12 may be of another composition such as, for example, a borosilicate or aluminosilicate composition.

Also, the transparency or absorption characteristics of the glass substrate 12 may vary between embodiments of the coated glass article. For example, in some embodiments, the glass substrate is a clear. In other embodiments, it may be preferable that the glass substrate 12 have a low iron content, which allows the glass substrate 12 to exhibit a high visible light transmittance. In some embodiments, the glass substrate 12 may comprise 0.15 weight % $Fe_2O_3$ (total iron) or less. As used herein, the phrase "total iron" refers to the total weight of iron oxide ($FeO+Fe_2O_3$) contained in the glass. More preferably, the glass substrate 12 comprises 0.1 weight % $Fe_2O_3$ (total iron) or less, and, even more preferably, a 0.02 weight % $Fe_2O_3$ (total iron) or less. In an embodiment, the glass substrate 12 may comprise 0.012 weight % $Fe_2O_3$ (total iron). In these embodiments, the glass substrate 12 may exhibit a total visible light transmittance of 91% or more in the CIELAB color scale system (Illuminant C, 10 degree observer). Further, the color of the glass substrate 12 can vary between embodiments. In an embodiment, the glass substrate 12 may be substantially clear. In still other embodiments, the glass substrate 12 may be tinted or colored.

A coating 14 is formed on the glass substrate 12. In an embodiment, the coating 14 is pyrolytic. As used herein, the term "pyrolytic" may refer to a coating or a layer of the coating that is chemically bonded to a glass substrate. Preferably, the coating 14 is formed on a first major surface 16 of the glass substrate 12. A side of the glass substrate 12 where the coating 14 is formed may be referred to herein as the coated side. A second major surface 18 of the glass substrate 12 and an opposite side of the coated glass article 10 may be uncoated. In other embodiments, an anti-reflective coating (not depicted) may be formed on the second major surface 18 of the glass substrate 12.

Preferably, the coating 14 is conductive. When the coated glass article is utilized in a photovoltaic cell, providing a conductive coating 14 enables the coating 14 to function in the photovoltaic cell as an electrode. The conductivity of the coating 14 will be described herein with reference to the sheet resistance and resistivity exhibited by the coating 14. It is preferred that the coating 14 is formed so as to exhibit a sheet resistance of 5-150 ohm/sq. More preferably, the coating 14 is formed so as to exhibit a sheet resistance of 50 ohm/sq. or less. For example, the coating 14 may be formed to exhibit a sheet resistance of 5-50 ohm/sq. Even more preferably, the coating 14 exhibits a sheet resistance of 5-25 ohm/sq. The sheet resistance exhibited by the coating 14 can be measured using a 4-point probe method and commercially available 4-point probes. Also, as will be described in more detail below, in some embodiments, the coating 14 may exhibit a reduced resistivity.

The coating 14 comprises one or more coating layers 20-26. In some embodiments, like the one illustrated in FIG. 1, the coating 14 comprises two or more coating layers 20-22. In an embodiment, the coating 14 comprises three or more coating layers 20, 22, 26. In another embodiment, the coating 14 comprises four or more coating layers 20-26. In yet another embodiment, the coating 14 may consist of four coating layers 20-26.

Each coating layer 20-26 may be formed by utilizing a coating apparatus. Descriptions of coating apparatuses suitable for being utilized to deposit each coating layer 20-26 can be found in U.S. Pat. Nos. 4,922,853 and 9,540,277, the entire disclosures of which are hereby incorporated by reference.

One or more of the coating layers 20-26 may be formed in conjunction with the manufacture of the glass substrate 12. Preferably, in these embodiments, the glass substrate 12 is formed utilizing the well-known float glass manufacturing process. In these embodiments, the coating 14 may be formed dynamically, i.e. as the glass substrate 12 is moving. Preferably, in these embodiments, the glass substrate 12 moves at a predetermined rate of, for example, greater than 3.175 m/min (125 in/min) as the coating 14 is being formed thereon. In an embodiment, the glass substrate 12 is moving at a rate of between 3.175 m/min (125 in/min) and 12.7 m/min (600 in/min) as the coating 14 is being formed.

Each coating layer 20-26 may be deposited by any suitable method but it is preferred that each coating layer 20-26 is deposited by atmospheric pressure chemical vapor deposition (APCVD). However, other known deposition methods are suitable for depositing one or more of the coating layers 20-26. In embodiments where the glass substrate 12 is a float glass ribbon, the coating 14 and each coating layer 20-26 is preferably formed in the heated zone of the float glass manufacturing process. In the heated zone of the float glass manufacturing process, the glass substrate 12 is heated. In an embodiment, the temperature of the glass substrate 12 is about 1100° F. (593° C.) or more when the coating 14 is formed thereover or thereon. In another embodiment, the temperature of the glass substrate 12 is between 1100° F. (593° C.) and 1400° F. (760° C.).

The first coating layer 20 is deposited over the glass substrate 12. More particularly, the first coating layer 20 is deposited over the first major surface 16 of the glass substrate 12. In an embodiment, the first coating layer 20 is also deposited over and, preferably, directly on the second coating layer 22. When the first coating layer 20 is deposited directly on the second coating layer 22, there are no intervening layers between the first coating layer 20 and the second coating layer 22. The first coating layer 20 may be the outermost layer of the coating 14. When the first coating layer 20 is the outermost layer of the coating 14, the first coating layer 20 forms an outer surface of the coated glass article 10. In other embodiments, one or more additional coating layers 24 may be deposited over the first coating layer 20. In these embodiments, the one or more additional coating layers 24 form the outer surface 28 of the coated glass article 10.

In certain embodiments, the first coating layer 20 is pyrolytic. In some embodiments, the first coating layer 20 has a refractive index that is less than 2.1. Preferably, the refractive index of the first coating layer 20 is between 1.8 and 2.1. More preferably, the refractive index of the first coating layer 20 is between 1.8 and 2.0. It should be noted that the refractive index values described herein are reported as an average value across 400-780 nm of the electromagnetic spectrum.

The first coating layer 20 comprises fluorine doped tin oxide ($SnO_2$:F) or another suitable conductive metal oxide. When the first coating layer 20 comprises fluorine doped tin oxide, it is preferred that the first coating layer 20 comprises tin, oxygen, and fluorine. However, in certain embodiments, the first coating layer 20 may also comprise other constituents including a trace amount or more of other elements such as, for example, carbon. As used herein, the phrase "trace amount" is an amount of a constituent of a coating layer that is not always quantitatively determinable because of its minuteness.

It is preferable that, when the first coating layer 20 comprises fluorine doped tin oxide, the fluorine doped tin oxide is stoichiometric fluorine doped tin oxide. However, if the fluorine doped tin oxide is slightly oxygen deficient it may still be useful. Therefore, the fluorine doped tin oxide may be of another suitable stoichiometry.

When the first coating layer 20 comprises fluorine doped tin oxide, the level of fluorine doping in the first coating layer 20 may vary between embodiments. In some of these embodiments, the fluorine doped tin oxide comprises tin oxide that may be fully doped with fluorine. As described herein, tin oxide is fully doped with fluorine when the carrier concentration exhibited by the fluorine doped tin oxide is $4.5 \times 10^{20}$ to $5.0 \times 10^{20}$ $cm^{-3}$. In other embodiments, the fluorine doped tin oxide may comprise tin oxide that is less than fully doped with fluorine. As described herein, tin oxide is less than fully doped with fluorine when the carrier concentration exhibited by the fluorine doped tin oxide is less than $4.5 \times 10^{20}$ $cm^{-3}$.

When the first coating layer 20 comprises fluorine doped tin oxide, the carrier concentration exhibited by the coating 14 may be largely dependent on the carrier concentration exhibited by the fluorine doped tin oxide. In embodiments where the first coating layer 20 comprises tin oxide that is less than fully doped with fluorine, the carrier concentration exhibited by the coating 14 may be between $2.5 \times 10^{20}$ and $4.5 \times 10^{20}$ $cm^{-3}$. In some embodiments, the carrier concentration exhibited by the coating 14 may be $2.5 \times 10^{20}$ to $4.0 \times 10^{20}$ $cm^{-3}$. In other embodiments, the carrier concentration exhibited by the coating 14 may be $2.5 \times 10^{20}$ to $3.5 \times 10^{20}$ $cm^{-3}$. In still other embodiments, the carrier concentration exhibited by the coating 14 may be $2.5 \times 10^{20}$ to $3.0 \times 10^{20}$ $cm^{-3}$. The carrier concentration exhibited by the coating 14 can be measured using commercially available Hall measurement systems such as the Ecopia HMS-3000.

In some embodiments, the first coating layer 20 is deposited by a chemical vapor deposition (CVD) process. Preferably, the first coating layer 20 is deposited over the glass substrate 12 while the first major surface 16 is at essentially atmospheric pressure. In this embodiment, the process utilized to deposit the first coating layer 20 may be an APCVD process. However, the first coating layer 20 may be formed by other processes as, in other embodiments, the first coating layer 20 may be formed under different conditions.

In embodiments where the first coating layer 20 is deposited by a CVD process, it is preferred that the first coating layer 20 is deposited by forming a gaseous mixture. In these embodiments, it is preferred that the gaseous mixture comprises a tin-containing compound, one or more oxygen-containing molecules, and a fluorine-containing compound. Suitable tin-containing compounds, oxygen-containing molecules, and fluorine-containing compounds are known in the art. However, in some embodiments, it may be preferred that the tin-containing compound is a halogen-containing tin compound, preferably a chlorine-containing compound. Preferred tin-containing compounds that also contain chlorine are dimethyltin dichloride (DMT), tin tetrachloride ($SnCl_4$) and monobutyltin trichloride (MBTC). The one or more oxygen-containing molecules may be molecular oxygen ($O_2$) and water ($H_2O$) vapor. In some embodiments, the gaseous mixture utilized to form the first coating layer 20 may comprise both molecular oxygen and water vapor. The fluorine-containing compound is utilized to provide the fluorine dopant. A suitable fluorine-containing compound is hydrogen fluoride. However, other fluorine-containing compounds maybe suitable for use in the gaseous mixture utilized to form the first coating layer 20. The gaseous mixture may also comprise one or more inert gases such as nitrogen ($N_2$), helium (He), and mixtures thereof.

When the first coating layer 20 comprises fluorine doped tin oxide, the first coating layer 20 is deposited on the second coating layer 22 at a thickness of 150 nm or more. In certain embodiments, the first coating layer 20 is deposited at a thickness of 150-1,000 nm. In one such embodiment, the first coating layer 20 is deposited at a thickness of 200-850 nm. Preferably, the first coating layer 20 is deposited at a thickness of 250-500 nm. More preferably, in these embodiments, the thickness of the first coating layer 20 is 350-400 nm. The thickness of the first coating layer 20 can be measured using a commercially available profilometer such as a KLA-Tencor P-16+.

The second coating layer 22 is provided between the glass substrate 12 and the first coating layer 20. The second coating layer 22 is deposited over and, preferably, directly on the third coating layer 26. When the second coating layer 22 is deposited directly on the third coating layer 26, there are no intervening layers between the second coating layer 22 and the third coating layer 26. In this position, the second coating layer 22 separates the first coating layer 20 from the third coating layer 26.

Preferably, the second coating layer 22 comprises a material that acts as a sodium diffusion barrier between the glass substrate 12 and the first coating layer 20. This may be particularly advantageous when the glass substrate 12 is a soda-lime-silica glass. It is also preferred that the second coating layer 22 comprises a material that provides a good nucleation layer for the first coating layer 20 so that the electrical conductivity of the first coating layer 20 is maintained and the coated glass article 10 exhibits a desired haze level.

Also, it is preferred that the second coating layer 22 comprises a material that exhibits favorable optical properties. In an embodiment, the second coating layer 22 has a refractive index that is less than the refractive index of the first coating layer 20 and the third coating layer 26. In this embodiment, the second coating layer 22 has a refractive index that is less than 1.8. Preferably, the refractive index of the second coating layer 22 is between 1.2 and 1.6. More preferably, the refractive index of the second coating layer 22 is between 1.2 and 1.5.

Preferably, the second coating layer 22 comprises silicon dioxide ($SiO_2$). In these embodiments, the second coating layer 22 comprises silicon and oxygen. The second coating layer 22 may also include a trace amount of one or more additional constituents such as, for example, carbon. In certain embodiments, the second coating layer 22 may comprise phosphorus. Preferably, in these embodiments, the second coating layer 22 comprises silicon dioxide and phosphorus. In other embodiments, the second coating layer 22 may consist essentially of silicon dioxide and phosphorus. Preferably, in these embodiments, the second coating layer 22 consists essentially of silicon, oxygen, and phosphorus. In some embodiments, the second coating layer 22 may comprise boron. Preferably, in these embodiments, the second coating layer 22 comprises silicon dioxide and boron. In other embodiments, the second coating layer 22 may consist essentially of silicon dioxide and boron. Preferably, in these embodiments, the second coating layer 22 consists essentially of silicon, oxygen, and boron. In still other embodiments, the second coating layer 22 may comprise phosphorus and boron. In these embodiments, the second coating layer 22 comprises silicon dioxide, phosphorus, and boron. In some of these embodiments, the second coating layer 22 may consist essentially of silicon, oxygen, phosphorus, and boron.

In certain embodiments, the second coating layer 22 is pyrolytic. Preferably, the second coating layer 22 has a thickness of at least 10 nm. In an embodiment, the second coating layer 22 has a thickness of 10-50 nm. Preferably, the second coating layer 22 has a thickness of 20-35 nm. Even more preferably, the second coating layer 22 has a thickness of 20-30 nm.

In an embodiment, the second coating layer 22 is deposited by a CVD process. Preferably, the second coating layer 22 is deposited over the glass substrate 12 while the first major surface 16 is at essentially atmospheric pressure. In this embodiment, the process utilized to deposit the second coating layer 22 is an APCVD process. However, the second coating layer 22 may be formed by other processes as, in other embodiments, the second coating layer may be formed under different conditions.

The second coating layer 22 may be deposited by providing one or more of a source of a silane compound, one or more sources of one or more oxygen-containing molecules, a source of a phosphorus-containing compound, a source of a boron-containing compound, and a source of a radical scavenger. In an embodiment, a source of an oxygen-containing molecule may be a source of water. Separate supply lines may extend from the sources of the reactant (precursor) molecules. As used herein, the phrases "reactant molecule" and "precursor molecule" may be used interchangeably to refer any or all of the silane compound, one or more oxygen-containing molecules, radical scavenger, phosphorus-containing compound, and boron-containing compound and/or used to describe the various embodiments thereof disclosed herein. Preferably, the sources of the precursor molecules are provided at a location outside the float bath chamber.

Preferably, the second coating layer 22 is deposited by forming a gaseous mixture. It is preferred that the precursor molecules suitable for use in the gaseous mixture are suitable for use in a CVD process. Such molecules may at some point be a liquid or a solid but are volatile such that they can be vaporized for use in the gaseous mixture. In certain embodiments, the gaseous mixture includes precursor molecules suitable for forming the second coating layer 22 at essentially atmospheric pressure. Once in a gaseous state, the precursor molecules can be included in a gaseous stream and utilized to form the second coating layer 22.

For any particular combination of gaseous precursor molecules, the optimum concentrations and flow rates for achieving a particular deposition rate and coating thickness may vary. However, in order to form the second coating layer 22, it is preferred that the gaseous mixture comprises a silane compound, one or more oxygen-containing molecules, a radical scavenger, and at least one of a phosphorus-containing compound and a boron-containing compound. In an embodiment, the gaseous mixture comprises a phosphorus-containing compound. In another embodiment, the gaseous mixture comprises a boron-containing compound. In further embodiments, the gaseous mixture may comprise the phosphorus-containing compound and the boron-containing compound.

In an embodiment, the silane compound is monosilane ($SiH_4$). However, other silane compounds are suitable for use in depositing the second coating layer 22. For example, disilane ($Si_2H_6$) is a suitable silane compound for use in depositing the second coating layer 22.

In some embodiments, one or more of the silane compound, radical scavenger, phosphorus-containing compound, and boron-containing compound may comprise one or more oxygen elements. However, it should be appreciated that the phrase "one or more oxygen-containing molecules" refers to one or more molecules included in the gaseous mixture that are separate from the silane compound, radical scavenger, phosphorus-containing compound, and boron-containing compound. The one or more oxygen-containing molecules comprise a first oxygen-containing molecule. In an embodiment, the first oxygen-containing molecule is molecular oxygen ($O_2$), which can be provided as a part of a gaseous composition such as air or in a substantially purified form. In another embodiment, the first oxygen-containing molecule is water ($H_2O$) vapor, which may be provided as steam. In certain embodiments, the one or more oxygen-containing molecules comprises two oxygen-containing molecules. In one such embodiment, the gaseous mixture comprises the first oxygen-containing molecule and a second oxygen-containing molecule. In this embodiment, the first oxygen-containing may be molecular oxygen and the second oxygen-containing molecule may be water vapor or vice versa. In this embodiment, the gaseous mixture may comprise more water vapor than molecular oxygen.

In general, utilizing only a silane compound in a CVD process produces a coating of amorphous silicon on a substrate. However, silane compounds may be pyrophoric and when an oxygen-containing molecule alone is added to a gaseous mixture comprising a pyrophoric silane compound, silicon dioxide is produced. However, silicon dioxide is produced at unacceptably high rates and an explosive reaction may result. Known methods of preventing such a reaction result in the deposition of coatings at very low, commercially impractical rates. Known methods are also limited in the amount of silane and oxygen that can be contained in the gaseous precursor mixture, as too high a concentration results in gas phase reaction of the elements, and no film being produced. Therefore, it is preferred that the gaseous mixture comprises a radical scavenger.

The presence of the radical scavenger allows the silane compound to be mixed with the one or more oxygen-containing molecules without undergoing ignition and premature reaction at the operating temperatures. The radical scavenger further provides control of and permits optimization of the kinetics of the reaction above, near, and/or on the glass substrate 12. In an embodiment, the radical scavenger is a hydrocarbon gas. Preferably, the hydrocarbon gas is ethylene ($C_2H_4$) or propylene ($C_3H_6$).

In an embodiment, the phosphorus-containing compound is an organic phosphorus-containing compound. Esters are preferred organic phosphorus-containing compounds for use in the gaseous mixture. For example, in an embodiment, the phosphorus-containing compound is triethylphosphite (TEP). In another embodiment, the phosphorus-containing compound may be triethylphosphate (TEPO). However, other phosphorus-containing compounds may be suitable for use in the gaseous mixture.

The benefits of utilizing a phosphorus-containing compound, like the embodiments described above, to form the second coating layer 22 can be realized even when the phosphorus-containing compound is provided in relatively small quantities in the gaseous mixture relative to the silane compound. For example, in an embodiment, the ratio of phosphorus-containing compound to silane compound in the gaseous mixture is 1:1000 or more. In certain embodiments, the ratio of phosphorus-containing compound to silane compound in the gaseous mixture is 1:200 to 1:20. Preferably, the ratio of phosphorus-containing compound to silane compound in the gaseous mixture is 1:200 to 1:25. More preferably, the ratio of phosphorus-containing compound to silane compound in the gaseous mixture is 1:200 to 1:50. When the gaseous mixture comprises a phosphorus-containing compound, the second coating layer 22 may comprise a trace amount of phosphorus or more. Unless it is stated otherwise, all ratios set out in the present application are calculated based on the percentages of particular precursor molecules in the gaseous mixture. The percentage of a particular precursor molecule in the gaseous mixture is calculated based on its volumetric flowrate (slpm) into the gaseous mixture divided by the total volumetric flowrate (slpm) of the gaseous mixture. Alternatively, assuming ideal gas conditions, the percentage of a particular precursor molecule in the gaseous mixture can also be calculated based on molar flowrates.

When the gaseous mixture comprises a boron-containing compound, it is preferred that the boron-containing compound is an organic boron-containing compound. Esters are preferred organic boron-containing compounds for use in the gaseous mixture. In an embodiment, the boron-containing compound is triethylborane (TEB). However, other boron-containing compounds may be suitable for use in the gaseous mixture.

The benefits of utilizing a boron-containing compound, like the embodiment described above, to form the second coating layer 22 can be realized when the boron-containing compound is provided in relatively small quantities in the gaseous mixture. For example, in an embodiment, the ratio of boron-containing compound to silane compound in the gaseous mixture is 1:10 or more. In an embodiment, the ratio of boron-containing compound to silane compound in the gaseous mixture is 1:10 to 1:1. Also, the benefits of utilizing a boron-containing compound to form the second coating layer 22 can be realized when the phosphorus-containing compound is provided in the gaseous mixture. In embodiments where the gaseous mixture comprises a phosphorus-containing compound and a boron-containing compound, it is preferred that there is more boron-containing compound in the gaseous mixture than phosphorus-containing compound. When the gaseous mixture comprises a boron-containing compound, the second coating layer 22 may comprise about 0-15 atomic % boron. More particularly, the second coating layer 22 may comprise 0-10 atomic % boron.

The gaseous mixture may also comprise one or more inert gases utilized as carrier or diluent gas. Suitable inert gases include nitrogen ($N_2$), helium (He), and mixtures thereof. Thus, sources of the one or more inert gases, from which separate supply lines may extend, may be provided.

The precursor molecules are mixed to form the gaseous mixture. As described above, the silane compound can be mixed with one or more oxygen-containing molecules without undergoing ignition and premature reaction due to the presence of the radical scavenger. When provided, the phosphorus-containing compound is also mixed with the silane compound, oxygen-containing molecule(s) and radical scavenger to form the gaseous mixture. Also, when provided, the boron-containing compound is mixed with the silane compound, oxygen-containing molecule(s), and radical scavenger to form the gaseous mixture. In certain embodiments, the boron-containing compound is mixed with the silane compound, oxygen-containing molecule(s), radical scavenger, and phosphorus-containing compound to form the gaseous mixture.

In certain embodiments, the gaseous mixture is fed through a coating apparatus prior to forming the second coating layer and discharged from the coating apparatus utilizing one or more gas distributor beams. Preferably, the gaseous mixture is formed prior to being fed through the coating apparatus. For example, the precursor molecules may be mixed in a feed line connected to an inlet of the coating apparatus. In other embodiments, the gaseous mixture may be formed within the coating apparatus. Separate coating apparatuses may be utilized to form the other coating layers 20, 24, 26.

The gaseous mixture is directed toward and along the glass substrate 12. Utilizing a coating apparatus aids in directing the gaseous mixture toward and along the glass substrate 12. Preferably, the gaseous mixture is directed toward and along the glass substrate 12 in a laminar flow.

The gaseous mixture reacts at or near the glass substrate 12 to form the second coating layer 22 thereover. Utilizing the embodiments of the gaseous mixture described above results in the deposition of a high quality coating layer over the glass substrate 12. In particular, the second coating layer 22 exhibits excellent coating thickness uniformity.

When the second coating layer 22 is formed in conjunction with the float glass manufacturing process, the second coating layer 22 may be formed by CVD, utilizing a coating apparatus, and/or at essentially atmospheric pressure. However, as should be appreciated, the second coating layer 22 may be formed utilizing another deposition process, under low-pressure conditions, and without the use of a coating apparatus.

The third coating layer 26 is deposited between the second coating layer 22 and the glass substrate 12. The third coating layer 26 is deposited over and, preferably, directly on the glass substrate 12. Thus, the third coating layer 26 separates the second coating layer 22 from the glass substrate 12.

In certain embodiments, the third coating layer 26 is pyrolytic. In some embodiments, the third coating layer 26 has a refractive index that is more than 1.6. In these embodiments, it is preferred that the third coating layer 26 has a refractive index that is less than 2.1. Preferably, the refractive index of the third coating layer 26 is between 1.8 and 2.1. More preferably, the refractive index of the third coating layer 26 is between 1.8 and 2.0.

In some embodiments, the third coating layer 26 may comprise undoped tin oxide ($SnO_2$) or another like material. When the third coating layer 26 comprises undoped tin oxide, the third coating layer 26 may be formed using halogen-containing tin compound, preferably a chlorine-containing compound. Preferred chlorine-containing compounds for use in forming the second coating layer are dimethyltin dichloride (DMT), tin tetrachloride ($SnCl_4$) and monobutyltin trichloride (MBTC).

In an embodiment, the third coating layer 26 is deposited directly on the glass substrate 12 at a thickness of 5-100 nm. Preferably, in this embodiment, the third coating layer 26 is deposited at a thickness of about 20-25 nm. When the second coating layer 22 comprises silicon dioxide as described above and the third coating layer 26 comprises tin oxide, the coating layers 22, 26 form an iridescence-suppressing interlayer. The iridescence-suppressing interlayer is advantageous because it allows the coated glass article 10 to exhibit a neutral color in transmittance and reflectance. In this embodiment, it may be preferred that the second coating layer 22 and the third coating layer 26 have a thickness of about $\frac{1}{6}^{th}$ to about $\frac{1}{12}^{th}$ of a 500 nm design wavelength.

As discussed above, one or more additional coating layers 24 may be deposited over the first coating layer 20 to achieve a desired coating stack. For example, as illustrated in FIG. 1, the fourth coating layer 24 may be deposited over the first coating layer 20. In some embodiments, the fourth coating layer 24 is deposited directly on the first coating layer 20. When the fourth coating layer 24 is deposited directly on the first coating layer 20, there are no intervening layers between the first coating layer 20 and the fourth coating layer 24. In some embodiments, the fourth coating layer 24 may be the outermost layer of the coating 14. When the fourth coating layer 24 is the outermost layer of the coating 14, the fourth coating layer 24 forms the outer surface 28 of the coated glass article 10.

Each additional coating layer 24 may be formed in conjunction with the float glass manufacturing process, shortly after forming the first coating layer 20, or as part of another manufacturing process. When the float glass manufacturing process is utilized, one or more of the one or more additional coating layers 24 may be pyrolytic and/or deposited utilizing an APCVD process. However, as should be appreciated, other processes known to those skilled in the art may be utilized.

In an embodiment, like the one illustrated in FIG. 1, the fourth coating layer 24 is provided and comprises a material having a desirable resistivity. Preferably, in this embodiment, the fourth coating layer 24 has a resistivity that is higher than the resistivity that is exhibited by the first coating layer 20. In this embodiment, the fourth coating layer 24 may comprise a transparent metal oxide material of, for example, silicon dioxide ($SiO_2$), titanium dioxide ($TiO_2$) or another transparent metal oxide material. Preferably, in this embodiment, the fourth coating layer 24 comprises undoped tin oxide ($SnO_2$). It is preferred that the fourth coating layer 24 has a refractive index that is more than 1.6. In some embodiments, the fourth coating layer 24 has a refractive index that is less than 2.1. Preferably, the refractive index of the fourth coating layer 24 is between 1.8 and 2.1. More preferably, the refractive index of the fourth coating layer 24 is between 1.8 and 2.0.

It has been discovered that with the addition of low concentrations of a phosphorus-containing compound to the gaseous mixture utilized to deposit the second coating layer 22, a coated glass article 10 that exhibits a reduction in haze is provided. As discussed herein, the term "haze" refers to the percentage of incident visible light that scatters when passing through the coated glass article. Haze can be measured using commercially available haze meters such as the BYK-Gardner haze-gard plus.

When the first coating layer 20 comprises fluorine doped tin oxide and a gaseous mixture comprising a phosphorus-containing compound and/or a boron-containing compound is utilized to deposit the second coating layer 22, the coated glass article 10 may exhibit a haze of 2.0% or less. In some embodiments, the haze exhibited by the coated glass article 10 is 0.5-2.0%. In other embodiments, the haze exhibited by the coated glass article 10 is 1.6% or less. In one such embodiment, the haze exhibited by the coated glass article 10 is 0.5-1.6%. Further, when low concentrations of a phosphorus-containing compound and a boron-containing compound are included in the gaseous mixture utilized to deposit the second coating layer 22, the haze exhibited by the coated glass article 10 may be further reduced.

Also, when the coated glass article comprises a second coating layer 22 like the one described above, the coating 14 may exhibit a reduced resistivity. For example, when the first coating layer 20 comprises fluorine doped tin oxide and the tin oxide of the first coating layer 20 is less than fully doped with fluorine, having a second coating layer 22 like the one described above allows the coating 14 to exhibit a reduced resistivity. It should be noted that the resistivity exhibited by the coating 14 is a calculated value that is reported in ohms centimeter (Ω-cm). As described herein, the resistivity exhibited by the coating 14 is calculated based on the sheet resistance exhibited by the coating 14 and the thickness of the first coating layer 20. In some embodiments, the coating 14 may exhibit a resistivity of $6.20 \times 10^{-4}$ Ω-cm or less. In other embodiments, the coating 14 may exhibit a resistivity of $6.0 \times 10^{-4}$ Ω-cm or less. Further, when low concentrations of a phosphorus-containing compound and a boron-containing compound are included in the gaseous mixture utilized to deposit the second coating layer 22, a coated glass article 10 having a coating 14 that exhibits a resistivity that is further reduced may be provided.

In certain embodiments, the coated glass article 10 may be utilized in the manufacture of a photovoltaic cell. Because more visible light can enter a photovoltaic cell that includes the coated glass article 10, the improvement in the haze exhibited by the coated glass article 10 enables the photovoltaic cell to produce more power. Additionally, a photovoltaic cell that includes the coated glass article 10 may experience less electrical loss due to the improvement in resistivity exhibited by the coated glass article. Thus, for this additional reason, a photovoltaic cell that includes the coated glass article 10 may produce more power.

Figure 2:
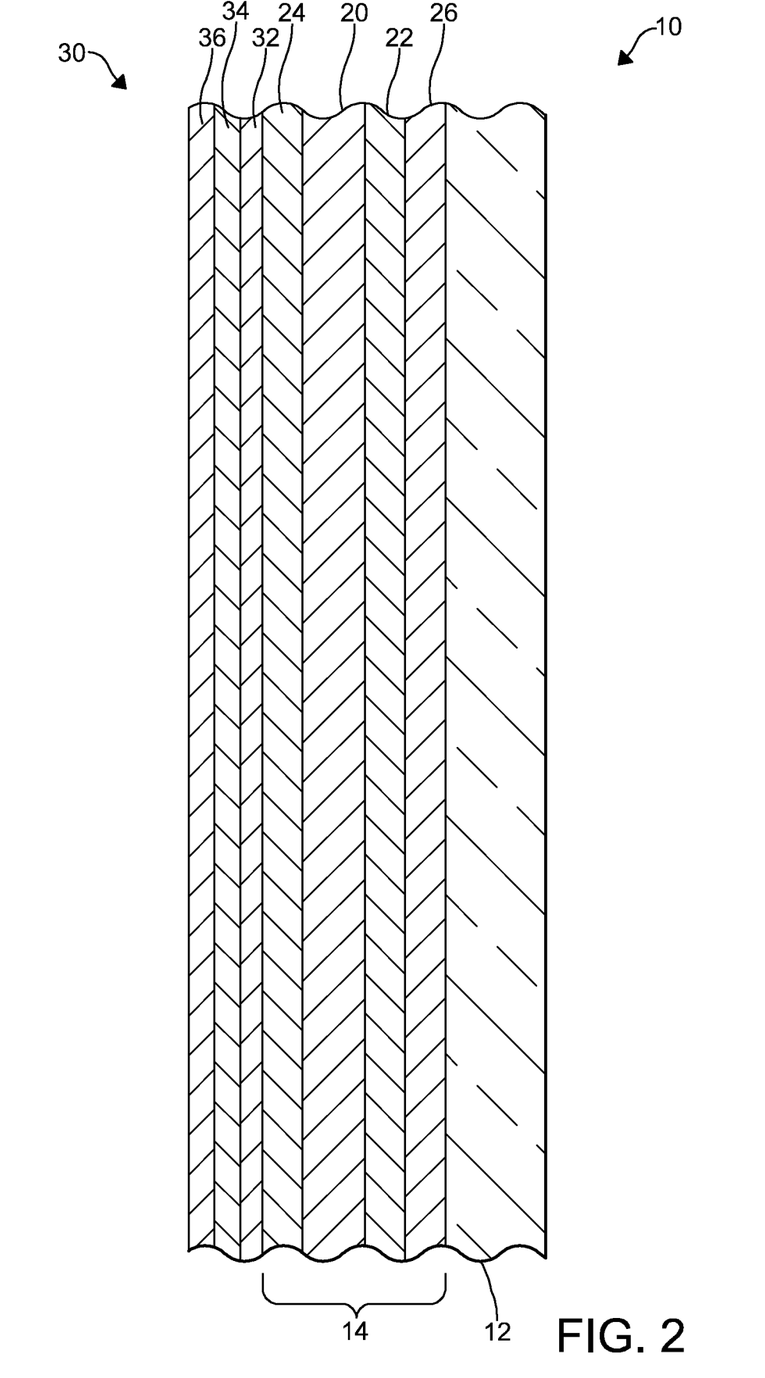
FIG. 2 is a cross-sectional view of an embodiment of a photovoltaic cell made with the coated glass article of FIG. 1.

A photovoltaic cell 30 comprising the coated glass article 10 is illustrated in FIG. 2. As illustrated, the photovoltaic cell 30 comprises the coated glass article 10. In some embodiments, the photovoltaic cell 30 is of the thin-film variety. In the embodiment illustrated, the photovoltaic cell 30 comprises one or more layers 32-36 formed on the coated glass article 10. At least one of the one or more layers 32-36 comprises thin-film photovoltaic materials. Thin-film photovoltaic materials known in the art are suitable for use in the photovoltaic cell 30. In the embodiment illustrated in FIG. 2, the photovoltaic cell 30 comprises two layers 32, 34 that comprise thin-film photovoltaic materials and another layer 36 that comprises a conductive material such as a metal or a conductive metal oxide. Metals and conductive metal oxides known in the art are suitable for use in the photovoltaic cell 30. In the embodiment illustrated, the two layers 32, 34 that comprise thin-film photovoltaic materials and the layer 36 that comprises the conductive material are formed over the first coating layer 20. In some embodiments (not depicted), one of the two layers 32, 34 that comprises thin-film photovoltaic materials is formed directly on the first coating layer 20. In other embodiments, one of the two layers 32, 34 that comprises thin-film photovoltaic materials is formed directly on the fourth coating layer 24. In these embodiments, the layer 36 that comprises the conductive material is formed over the two layers 32, 34 that comprise thin-film photovoltaic materials. In this position, the layer 36 that comprises the conductive material may function in the photovoltaic cell 30 as an electrode. It should be appreciated that the one or more layers 32-36 formed on the coated glass article 10 may be formed over the first coating layer 20 during the manufacturing of the photovoltaic cell 30.

As discussed, above, the coating 14 may be formed in conjunction with the manufacture of the glass substrate 12 in the well-known float glass manufacturing process. The float glass manufacturing process is typically carried out utilizing a float glass installation such as the installation 40 depicted in the FIG. 3. However, it should be understood that the float glass installation 40 described herein is only illustrative of such installations.

Figure 3:
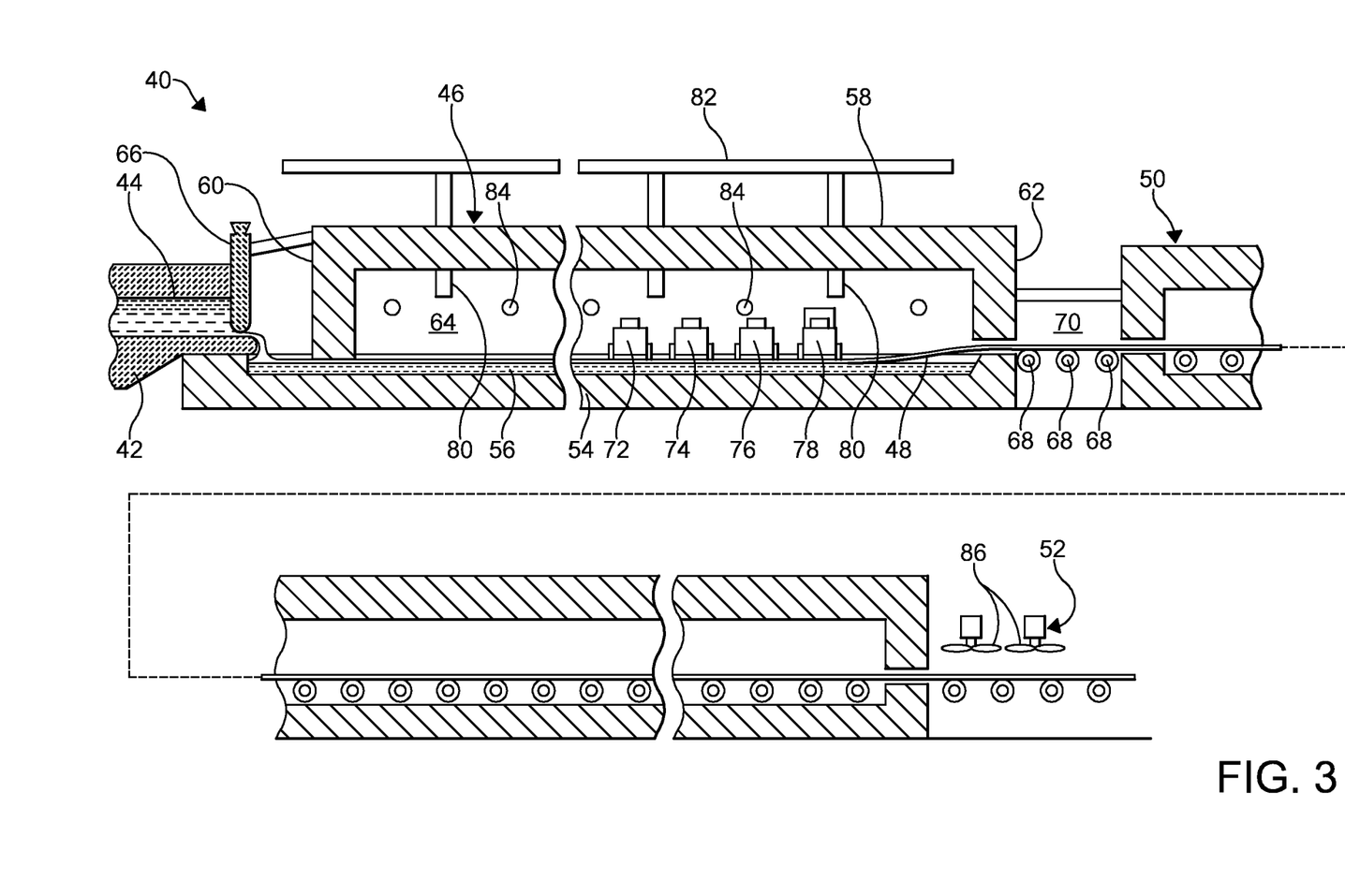
FIG. 3 is a schematic view, in vertical section, of an installation for practicing the float glass manufacturing process in accordance with an embodiment of the invention.

As illustrated in FIG. 3, the float glass installation 40 may comprise a canal section 42 along which molten glass 44 is delivered from a melting furnace, to a float bath section 46 wherein the glass substrate is formed. In this embodiment, the glass substrate will be referred to as a glass ribbon 48. The glass ribbon 48 is a preferable substrate on which the coating 14 is formed. However, it should be appreciated that the glass substrate 12 is not limited to being a glass ribbon.

The glass ribbon 48 advances from the bath section 46 through an adjacent annealing lehr 50 and a cooling section 52. The float bath section 46 includes: a bottom section 54 within which a bath of molten tin 56 is contained, a roof 58, opposite side walls (not depicted) and end walls 60, 62. The roof 58, side walls and end walls 60, 62 together define an enclosure 64 in which a non-oxidizing atmosphere is maintained to prevent oxidation of the molten tin 56.

In operation, the molten glass 44 flows along the canal 42 beneath a regulating tweel 66 and downwardly onto the surface of the tin bath 56 in controlled amounts. On the molten tin surface, the molten glass 44 spreads laterally under the influence of gravity and surface tension, as well as certain mechanical influences, and it is advanced across the tin bath 56 to form the glass ribbon 48. The glass ribbon 48 is removed from the bath section 46 over lift out rolls 68 and is thereafter conveyed through the annealing lehr 50 and the cooling section 52 on aligned rolls. The deposition of the coating 14 preferably takes place in the float bath section 46, although it may be possible for deposition to take place further along the glass production line, for example, in the gap 70 between the float bath 46 and the annealing lehr 50, or in the annealing lehr 50.

As illustrated in the FIG. 3, four coating apparatuses 72, 74, 76, 78 are shown within the float bath section 46. The coating 14 may be formed utilizing the coating apparatuses 72-78 with each coating apparatuses utilized to deposit one of the coating layers 20-26. For example, in an embodiment, the third coating layer 26, which preferably comprises undoped tin oxide, is deposited utilizing the first coating apparatus 72. In this embodiment, the second coating layer 22 is deposited utilizing an adjacent coating apparatus 74. The remaining coating apparatuses 76, 78 are utilized to form the first coating layer 20 and the fourth coating layer 24, which preferably comprises undoped tin oxide.

A suitable non-oxidizing atmosphere, generally nitrogen or a mixture of nitrogen and hydrogen in which nitrogen predominates, is maintained in the float bath section 46 to prevent oxidation of the molten tin 56 comprising the float bath. The atmosphere gas is admitted through conduits 80 operably coupled to a distribution manifold 82. The non-oxidizing gas is introduced at a rate sufficient to compensate for normal losses and maintain a slight positive pressure, on the order of between about 0.001 and about 0.01 atmosphere above ambient atmospheric pressure, so as to prevent infiltration of outside atmosphere. For purposes of the describing the invention, the above-noted pressure range is considered to constitute normal atmospheric pressure.

Preferably, the coating 14 is formed at essentially atmospheric pressure. Thus, the pressure of the float bath section 46, annealing lehr 50, and/or in the gap 70 between the float bath 46 and the annealing lehr 50 may be essentially atmospheric pressure.

Heat for maintaining the desired temperature regime in the float bath section 46 and the enclosure 64 is provided by radiant heaters 84 within the enclosure 64. The atmosphere within the lehr 50 is typically atmospheric air, as the cooling section 52 is not enclosed and the glass ribbon 48 is therefore open to the ambient atmosphere. The glass ribbon 48 is subsequently allowed to cool to ambient temperature. To cool the glass ribbon 48, ambient air may be directed against the glass ribbon 48 as by fans 86 in the cooling section 52. Heaters (not depicted) may also be provided within the annealing lehr 50 for causing the temperature of the glass ribbon 48 to be gradually reduced in accordance with a predetermined regime as it is conveyed therethrough.

Examples

TABLES 1 and 2 are provided below to illustrate the advantages of certain examples within the scope of the invention. In TABLE 1, examples within the scope of the invention are Ex 1-Ex 4. In TABLE 2, examples within the scope of the invention are Ex 5-Ex 14. However, Ex 1-Ex 14 are for illustrative purposes only and are not to be construed as a limitation on the invention. Comparative examples, not considered to be a part of the invention, are designated in TABLE 1 as C1 and in TABLE 2 as C2.

The following experimental conditions are applicable to C1 and Ex 1-Ex 4. The coated glass articles of C1 and Ex 1-Ex 4 each comprise a coating that includes four coating layers and are of a glass/$SnO_2$/$SiO_2$:X/$SnO_2$/F/$SnO_2$ arrangement, where X is phosphorus. The coating layers were formed utilizing an APCVD process and deposited on a soda-lime-silica glass substrate. The glass substrate was formed in conjunction with a float glass manufacturing process and was moving when the coating layers were deposited in the heated zone of the float glass manufacturing process.

For C1 and Ex 1-Ex 4, after forming the second coating layer, a first coating layer comprising fluorine doped tin oxide was deposited. The tin oxide in the first coating layer of C1 and Ex 1-Ex 4 was less than fully doped with fluorine. The first coating layer for each of the coated glass articles of C1 and Ex 1-Ex 4 was pyrolytic. For C1, the thickness of the first coating layer was 380.1 nm. For Ex 1, the thickness of the first coating layer was 365 nm. For Ex 2, the thickness of the first coating layer was 356.7 nm. For Ex 3, the thickness of the first coating layer was 352.6 nm. For Ex 4, the thickness of the first coating layer was 352.4 nm. Before forming the second coating layer, a third coating layer comprising undoped tin oxide was deposited. The third coating layer was pyrolytic and formed in accordance with the embodiments described above. A fourth coating layer was deposited over the first coating layer. The fourth coating layer was pyrolytic and comprised undoped tin oxide. The fourth coating layer was formed in accordance with the embodiments described above.

The second coating layer for each of the coated glass articles of C1 and Ex 1-Ex 4 was pyrolytic and deposited by forming a gaseous mixture. For C1, the gaseous mixture comprised monosilane ($SiH_4$), molecular oxygen ($O_2$), water ($H_2O$) vapor, ethylene ($C_2H_4$), and inert gas. For Ex 1-Ex 4, the gaseous mixture comprised monosilane ($SiH_4$), molecular oxygen ($O_2$), water ($H_2O$) vapor, ethylene ($C_2H_4$), triethylphosphite (TEP), and inert gas. For each of C1 and Ex 1-Ex 4, the precursor molecules were mixed to form the gaseous mixture and then fed through a coating apparatus before being directed toward and along the glass substrate.

The ratios of phosphorus-containing compound to silane compound in the gaseous mixtures utilized to form the second coating layers of C1 and Ex 1-Ex 4 are reported in TABLE 1 in the column labelled P:Si. The haze exhibited by the coated glass articles of C1 and Ex 1-Ex 4 are reported in TABLE 1. The haze exhibited by the coated glass articles of C1 and Ex 1-Ex 4 was measured on the coated side of each coated glass article using a BYK-Gardner haze-gard plus and is expressed as a percentage. Also, the resistivities exhibited by the coatings of the coated glass articles of C1 and Ex 1-Ex 4 are reported in TABLE 1. Each resistivity was calculated based on the sheet resistance exhibited by the coating of the coated glass article and the first coating layer thickness. For C1 and Ex 1-Ex 4, the sheet resistance exhibited by the coating of the coated glass article was measured using a 4-point probe method and a 4-point probe. For C1 and Ex 1-Ex 4, the thickness of the first coating layer was measured by a step height method using a KLA-Tencor P-16+ profilometer. Each resistivity is reported in ohms centimeter ($\Omega$-cm). Also, the carrier concentrations exhibited by the coatings of the coated glass articles of C1 and Ex 1-Ex 4 are reported in TABLE 1. The carrier concentrations exhibited by the coatings of the coated glass articles of C1 and Ex 1-Ex 4 were measured using a Ecopia HMS-3000 Hall measurement system and are reported in $cm^{-3}$.

TABLE 1

| Examples | P:Si | Haze | Resistivity | Carrier Concentration |
|---|---|---|---|---|
| C1 | 0 | 1.93 | 6.72E−04 | 2.68 × 10$^{20}$ |
| Ex 1 | 1:100 | 1.30 | 5.95E−04 | 3.14 × 10$^{20}$ |
| Ex 2 | 1:55 | 1.22 | 5.56E−04 | 3.33 × 10$^{20}$ |
| Ex 3 | 1:36 | 1.26 | 5.62E−04 | 3.20 × 10$^{20}$ |
| Ex 4 | 1:25 | 1.23 | 5.99E−04 | 3.08 × 10$^{20}$ |

As shown by Ex 1-Ex 4, with the use of a phosphorus-containing compound to form the second coating layer, a coated glass article that exhibits a reduced haze and resistivity can be provided. For example, the comparative coated glass article of C1 exhibited a haze of 1.93% and the coating of the coated glass article of C1 exhibited a resistivity of 6.72E-04. However, the coated glass articles of Ex 1-Ex 4 all exhibited haze levels of 1.30% or less and the coatings of the coated glass articles of Ex 1-Ex 4 all exhibited resistivities of less than 6.0E-04. Also, as shown by Ex 1-Ex 4, as the ratio of phosphorus-containing compound to silane compound in the gaseous mixtures utilized to form the second coating layer increases, additional reductions in haze and the resistivity can be achieved.

The following experimental conditions are applicable to C2 and Ex 5-Ex 14. The coated glass articles of C2 and Ex 5-Ex 14 each comprise a coating that included four coating layers and are of a glass/$SnO_2$/$SiO_2$:X/$SnO_2$:F/$SnO_2$ arrangement, where X is phosphorus or phosphorus and boron. The coating layers were formed utilizing an APCVD process and deposited on a soda-lime-silica glass substrate. The glass substrate was formed in conjunction with a float glass manufacturing process and was moving at a line speed of 9.19 m/min when the coating layers were deposited in the heated zone of the float glass manufacturing process.

For C2 and Ex 5-Ex 14, after forming the second coating layer, a first coating layer comprising fluorine doped tin oxide was deposited. The tin oxide in the first coating layers of C2 and Ex 5-Ex 14 was less than fully doped with fluorine. The first coating layer for each of the coated glass articles of C2 and Ex 5-Ex 14 was pyrolytic. The thicknesses of the first coating layers of C2 and Ex 5-Ex 14 are reported in TABLE 2 in nanometers. Before forming the second coating layer, a pyrolytic third coating layer comprising undoped tin oxide was deposited. The third coating layer was pyrolytic and formed in accordance with the embodiments described above. A fourth coating layer was deposited over the first coating layer. The fourth coating layer was pyrolytic and comprised undoped tin oxide. The fourth coating layer was formed in accordance with the embodiments described above.

The second coating layer for each of the coated glass articles of C2 and Ex 5-Ex 14 was pyrolytic and deposited by forming a gaseous mixture. For C2, the gaseous mixture comprised monosilane ($SiH_4$), molecular oxygen ($O_2$), water ($H_2O$) vapor, ethylene ($C_2H_4$), and inert gas. For Ex 5-Ex 8, the gaseous mixture comprised monosilane ($SiH_4$), molecular oxygen ($O_2$), water ($H_2O$) vapor, ethylene ($C_2H_4$), triethylphosphite (TEP), and inert gas. For Ex 9-Ex 14, the gaseous mixture comprised monosilane ($SiH_4$), molecular oxygen ($O_2$), water ($H_2O$) vapor, ethylene ($C_2H_4$), triethylphosphite (TEP), triethylborane (TEB), and inert gas. For each of C2 and Ex 5-Ex 14, the precursor molecules were mixed to form the gaseous mixture and then fed through a coating apparatus before being directed toward and along the glass substrate.

The ratios of phosphorus-containing compound to silane compound in the gaseous mixtures utilized to form the second coating layers of C2 and Ex 5-Ex 14 are reported in TABLE 2 in the column labelled P:Si. The ratios of boron-containing compound to silane compound in the gaseous mixtures utilized to form the second coating layers of Ex 9-Ex 14 are reported in TABLE 2 in the column labelled B:Si. The haze exhibited by the coated glass articles of C2 and Ex 5-Ex 14 are reported in TABLE 2. The haze exhibited by the coated glass articles of C2 and Ex 5-Ex 14 was measured on the coated side of each coated glass article using a BYK-Gardner haze-gard plus haze meter and is expressed as a percentage. Also, the resistivities exhibited by the coatings of the coated glass articles of C2 and Ex 5-Ex 14 are reported in TABLE 2. Each resistivity was calculated based on the sheet resistance exhibited by the coating of the coated glass article and the first coating layer thickness. For C2 and Ex 5-Ex 14, the sheet resistance exhibited by the coating of the coated glass article was measured using a 4-point probe method and a 4-point probe. For C2 and Ex 5-Ex 14, the thickness of the first coating layer was measured by a step height method using a KLA-Tencor P-16+ profilometer. Each resistivity is reported in ohms centimeter ($\Omega$-cm). Also, the carrier concentrations exhibited by the coatings of the coated glass articles of C2 and Ex 5-Ex 14 are reported in TABLE 2. The carrier concentrations exhibited by the coatings of the coated glass articles of C2 and Ex 5-Ex 14 were measured using a Ecopia HMS-3000 Hall measurement system and are reported in $cm^{-3}$. The carrier concentrations are reported in $cm^{-3}$.

As illustrated in TABLE 2, the coated glass articles of Ex 5-Ex 14 exhibit improved haze over the haze exhibited by the comparative coated glass article of C2. Also, the coatings of the coated glass articles of Ex 5-Ex 14 exhibit improved resistivities over the resistivity exhibited by the coating of the comparative coated glass article of C2. Further, as illustrated by the coated glass articles of Ex 5-Ex 8, as the ratio of phosphorus-containing compound to silane compound in the gaseous mixtures utilized to form the second coating layer increased, the haze exhibited by the coated glass articles and the resistivities exhibited by the coatings of the coated glass articles decreased. The coated glass articles of Ex 9-Ex 14 illustrate that, when a boron-containing compound was added to the gaseous mixture, additional improvements in the haze and resistivity can be achieved. Furthermore, the coated glass articles of Ex 9-Ex 14 illustrate that as the ratio of boron-containing compound to silane compound in the gaseous mixtures utilized to form the second coating layer increased, the haze exhibited by the coated glass articles and the resistivity exhibited by the coatings of the coated glass articles generally decreased.

It should also be noted that the second coating layers for all of the coated glass articles of Ex 9-Ex 14 exhibited less than 10 atomic % boron and that the coated glass articles of Ex 9-Ex 14 illustrate that as the ratio of boron-containing compound to silane compound in the gaseous mixtures utilized to form the second coating layer increases, the concentration of boron in the second coating layer may increase. For example, in Ex 9, where the ratio of boron-containing compound to silane compound in the gaseous mixtures utilized to form the second coating layer was 1:3.43, the atomic % of boron in the second coating layer was 4.0. In Ex 10, where the ratio of boron-containing compound to silane compound in the gaseous mixtures utilized to form the second coating layer was increased to 1:1.71, the atomic % of boron in the second coating layer increased to 5.8 and, in Ex 11, where the ratio of boron-containing compound to silane compound in the gaseous mixtures utilized to form the second coating layer was further increased to 1:1.14, the atomic % of boron in the second coating layer increased to 7.6.

The foregoing description is considered as illustrative only of the principles of the invention. Further, since numerous modifications and changes will readily occur to those skilled in the art, it is not desired to limit the invention to the exact construction and processes shown and described herein. Accordingly, all suitable modifications and equivalents may be considered as falling within the scope of the invention.

TABLE 2

| Examples | First Coating Layer Thickness | P:Si | B:Si | Haze | Resistivity | Carrier Concentration |
| --- | --- | --- | --- | --- | --- | --- |
| C2 | 366.0 | 0 | 0 | 2.27 | 6.24E−04 | $2.95 \times 10^{20}$ |
| Ex 5 | 382.5 | 1:867 | 0 | 1.93 | 6.10E−04 | $3.01 \times 10^{20}$ |
| Ex 6 | 385.2 | 1:200 | 0 | 1.93 | 6.04E−04 | $3.13 \times 10^{20}$ |
| Ex 7 | 371.8 | 1:100 | 0 | 1.54 | 5.70E−04 | $3.28 \times 10^{20}$ |
| Ex 8 | 367.9 | 1:50 | 0 | 1.47 | 5.57E−04 | $3.27 \times 10^{20}$ |
| Ex 9 | 376.4 | 1:100 | 1:3.43 | 1.3 | 5.92E−04 | $3.24 \times 10^{20}$ |
| Ex 10 | 362.6 | 1:100 | 1:1.71 | 1.32 | 5.59E−04 | $3.22 \times 10^{20}$ |
| Ex 11 | 360.2 | 1:100 | 1:1.14 | 1.24 | 5.63E−04 | $3.27 \times 10^{20}$ |
| Ex 12 | 369.1 | 1:200 | 1:3.43 | 1.21 | 5.84E−04 | $3.29 \times 10^{20}$ |
| Ex 13 | 366.9 | 1:200 | 1:1.71 | 1.13 | 5.82E−04 | $3.28 \times 10^{20}$ |
| Ex 14 | 366.7 | 1:200 | 1:1.14 | 1.22 | 5.80E−04 | $3.29 \times 10^{20}$ |

The invention claimed is:

1. A coated glass article comprising:
    a glass substrate; and
    a coating formed on the glass substrate, wherein the coating comprises:
    i. a first coating layer comprising fluorine doped tin oxide,
    ii. a second coating layer provided between the glass substrate and the first coating layer, the second coating layer consisting essentially of silicon dioxide, phosphorus and boron,
    wherein the coated glass article exhibits a haze of 2.0% or less.

2. The coated glass article of claim 1, wherein the glass substrate is a soda-lime-silica glass and/or wherein the glass substrate comprises 0.15 weight % $Fe_2O_3$ (total iron) or less.

3. The coated glass article of claim 1, wherein the coating is pyrolytic.

4. The coated glass article of claim 1, wherein the first coating layer is deposited at a thickness of 150-1,000 nm.

5. The coated glass article of claim 1, wherein the second coating layer has a refractive index that is less than 1.8 or wherein the refractive index of the second coating layer is between 1.2 and 1.6.

6. The coated glass article of claim 1, further comprising a third coating layer deposited directly on a major surface of the glass substrate, wherein the second coating layer is deposited directly on the third coating layer such that there are no intervening layers between the second coating layer and the third coating layer.

7. The coated glass article of claim 1, further comprising an additional coating layer deposited directly on the first coating layer, wherein the additional coating layer is deposited directly on the first coating layer such that there are no intervening layers between the first coating layer and the additional coating layer.

8. The coated glass article of claim 1, wherein the haze exhibited by the coated glass article is 0.5-2.0%.

9. The coated glass article of claim 1, wherein the haze exhibited by the coated glass article is 1.6% or less or wherein the haze exhibited by the coated glass article is 0.5-1.6%.

10. The coated glass article of claim 1, wherein the fluorine doped tin oxide comprises tin oxide that is less than fully doped with fluorine or wherein the fluorine doped tin oxide comprises tin oxide that is fully doped with fluorine.

11. The coated glass article of claim 4, wherein the thickness of the first coating layer is 200-850 nm or wherein the thickness of the first coating layer is 250-500 nm.

12. The coated glass article of claim 6, wherein the third coating layer comprises undoped tin oxide.

13. The coated glass article of claim 7, wherein the additional coating layer is a fourth coating layer that forms an outer surface of the coated glass article.

14. The coated glass article of claim 7, wherein the additional coating layer comprises undoped tin oxide.

15. The coated glass article of claim 1, wherein the sheet resistance exhibited by the coating is 5-50 ohm/sq.

16. A method of making a coated glass article, comprising:
    providing a glass substrate; and
    forming a coating on the glass substrate by depositing a first coating layer, wherein the first coating layer comprises fluorine doped tin oxide, and providing a second coating layer between the glass substrate and the first coating layer, wherein the second coating layer consisting essentially of silicon dioxide, phosphorus and boron, wherein the coated glass article exhibits a haze of 2.0% or less.

17. The method of claim 16, further comprising forming a gaseous mixture comprised of a silane compound, a first oxygen-containing molecule, a radical scavenger, a phosphorus-containing compound and a boron-containing compound, directing the gaseous mixture toward and along the glass substrate, and reacting the gaseous mixture over the glass substrate to form the second coating layer on the glass substrate and/or further comprising depositing the first coating layer directly on the second coating layer such that there are no intervening layers between the first coating layer and the second coating layer.

18. The method of claim 16, further comprising depositing a third coating layer that comprises undoped tin oxide directly on a major surface of the glass substrate, wherein the second coating layer is deposited directly on the third coating layer such that there are no intervening layers between the second coating layer and the third coating layer and/or further comprising depositing a fourth coating layer that comprises undoped tin oxide directly on the first coating layer, wherein the fourth coating layer is deposited directly on the first coating layer such that there are no intervening layers between the first coating layer and the fourth coating layer.

19. A photovoltaic cell comprising the coated glass article of claim 1.

* * * * *